Feb. 28, 1967  R. WHITMAN  3,306,013
PICKING UNIT FOR POD HARVESTER
Filed Oct. 14, 1964  6 Sheets-Sheet 1

INVENTOR.
RAY WHITMAN
BY
Owen, Wickersham & Erickson
ATTORNEYS

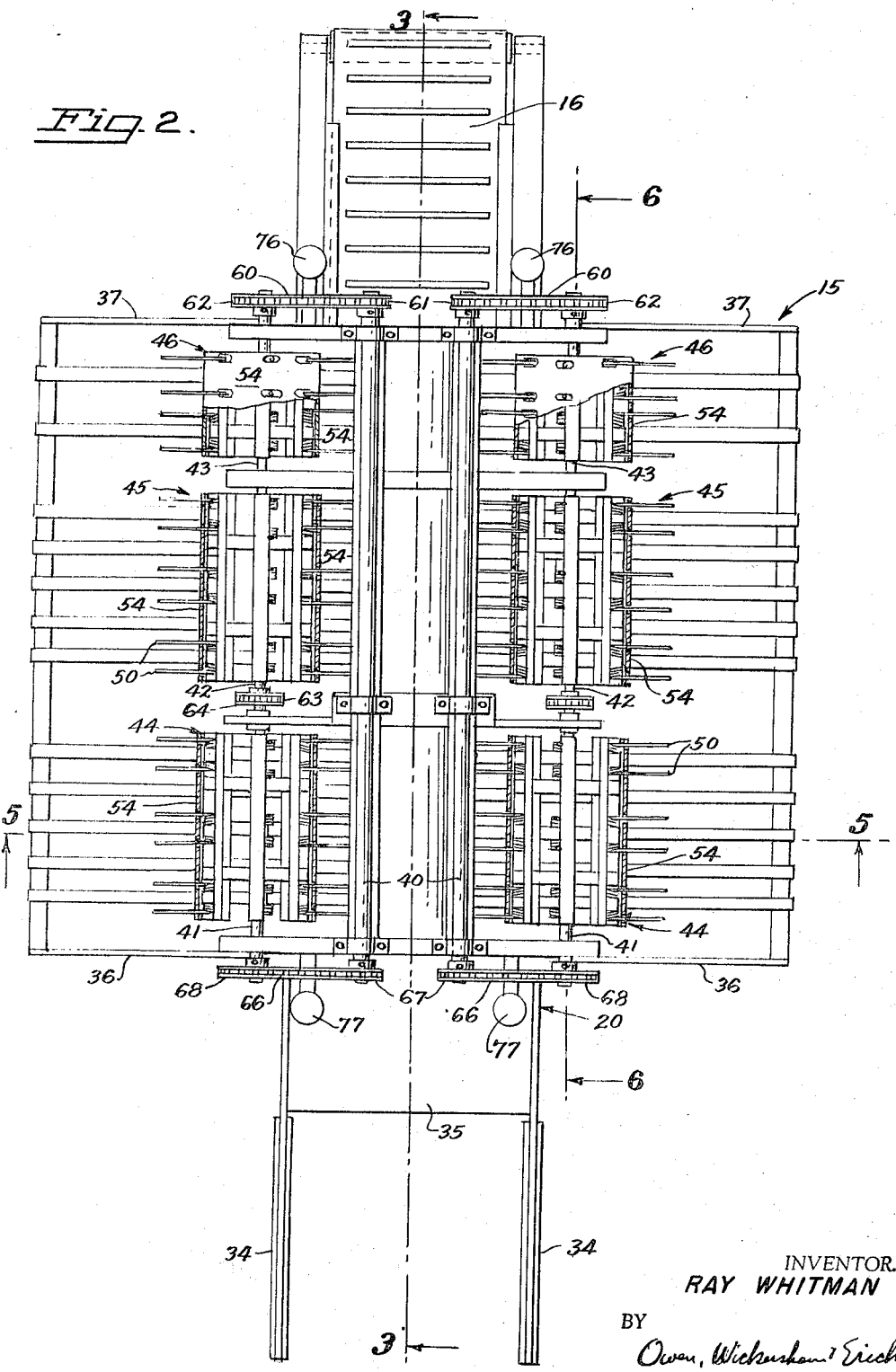

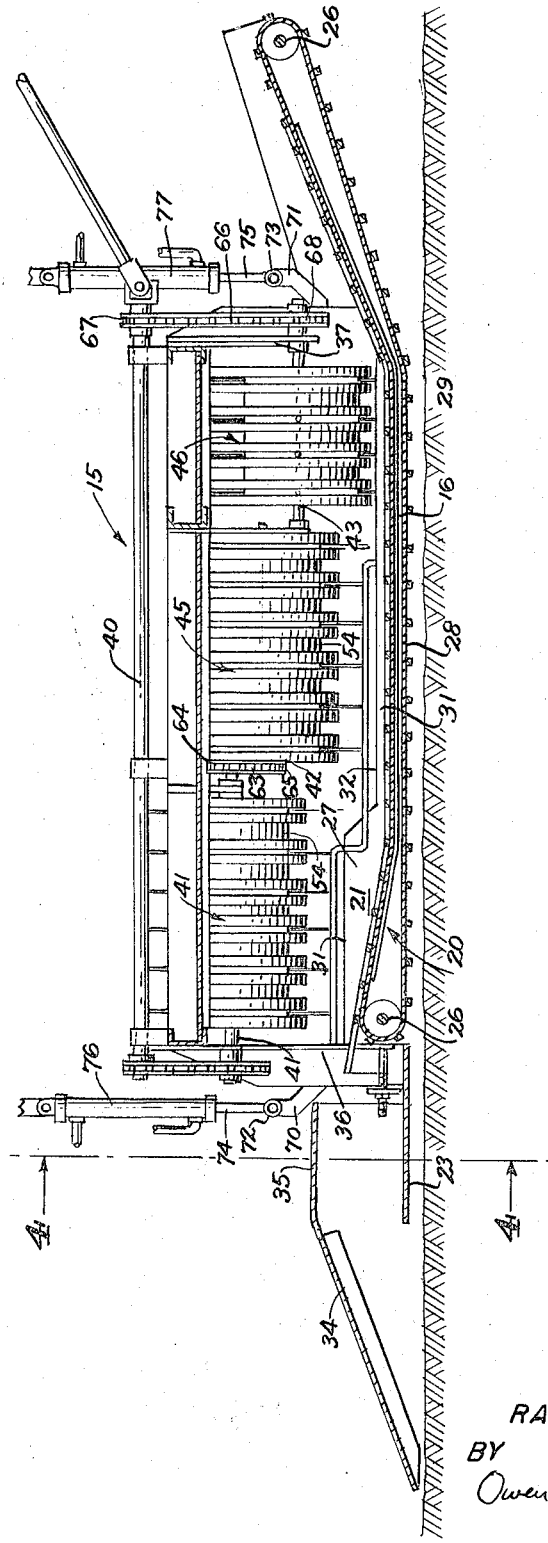

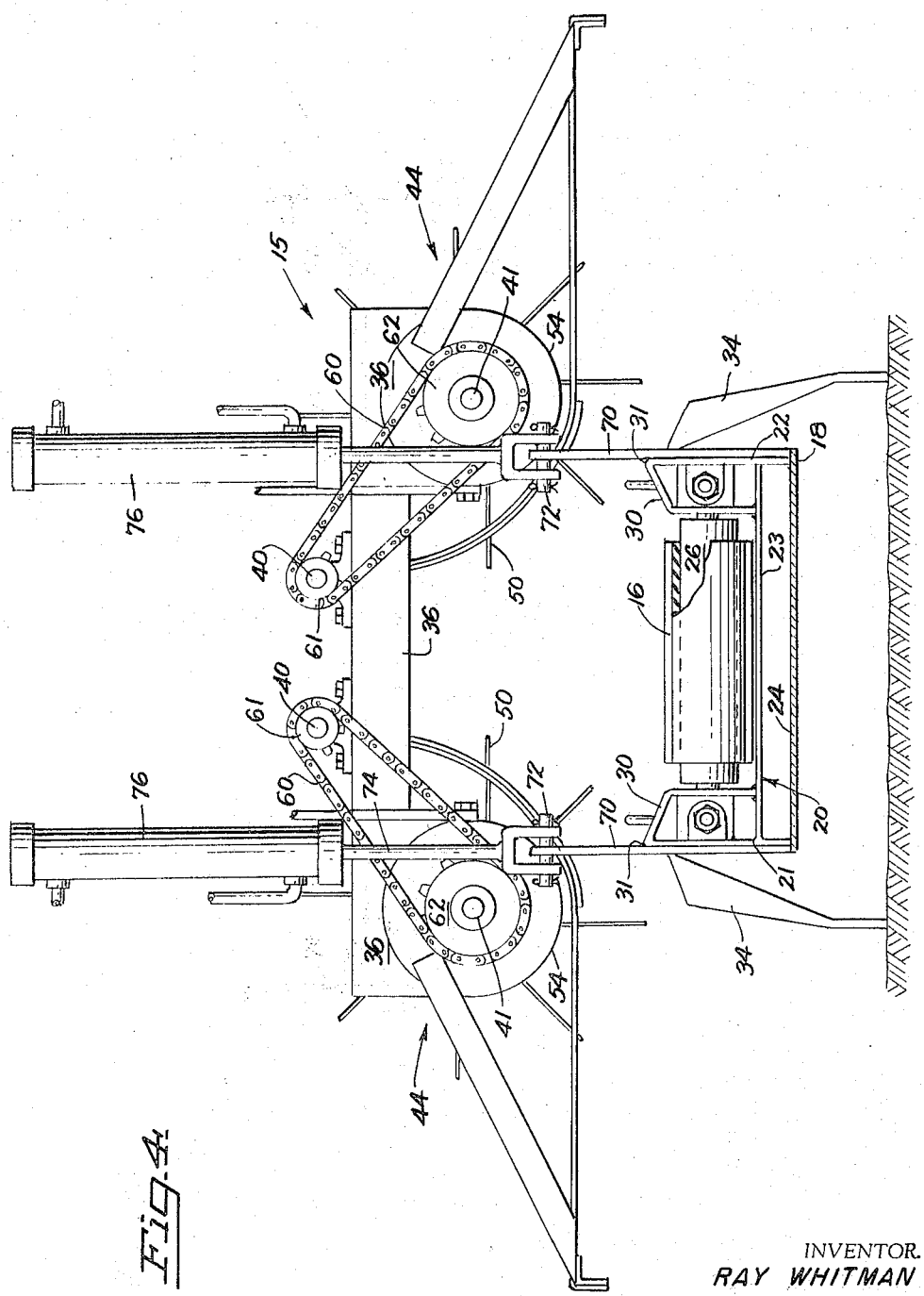

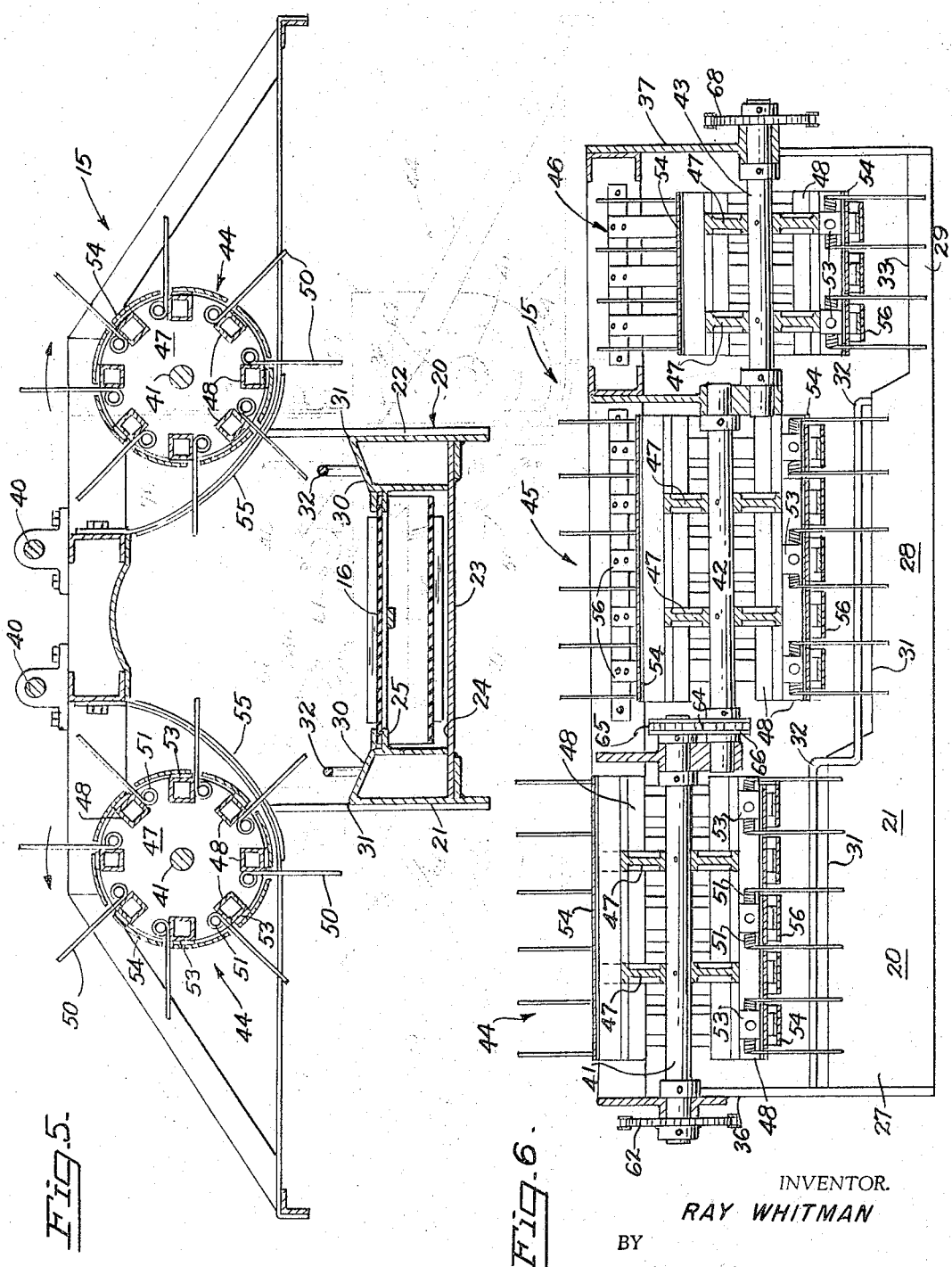

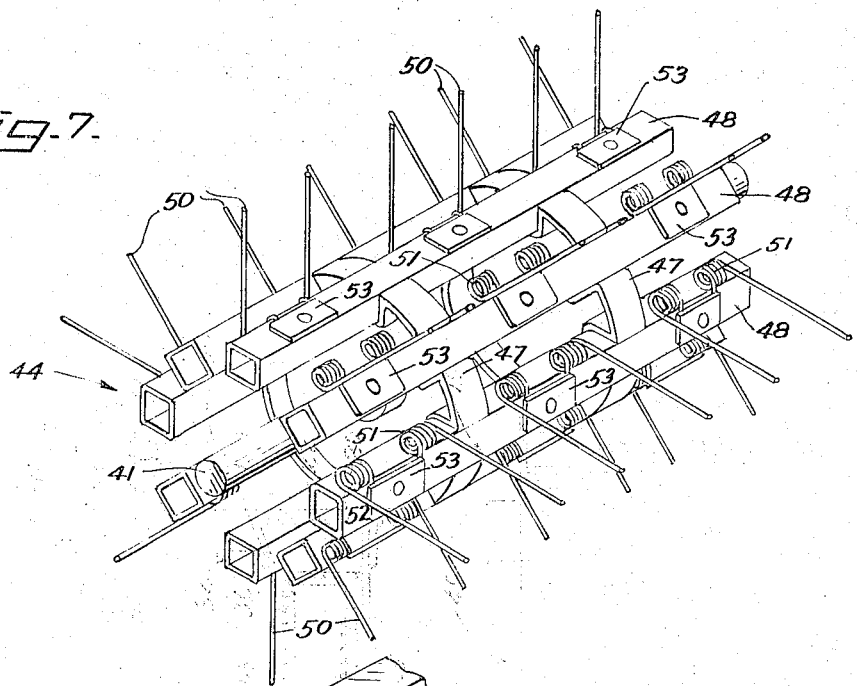
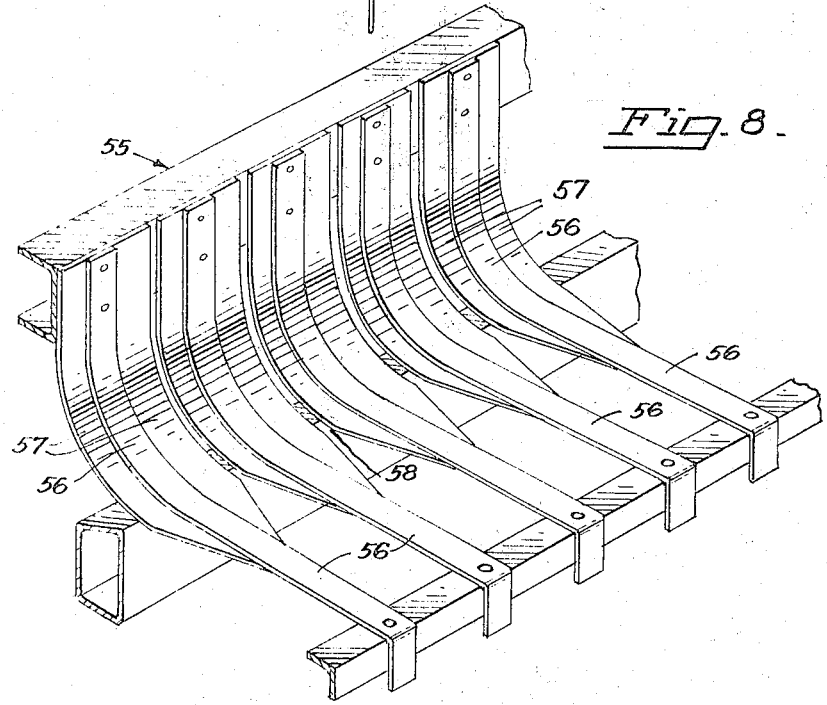

United States Patent Office 3,306,013
Patented Feb. 28, 1967

3,306,013
PICKING UNIT FOR POD HARVESTER
Ray Whitman, Patterson, Calif., assignor to
Virginia Gray, Cunningham, Kans.
Filed Oct. 14, 1964, Ser. No. 403,711
27 Claims. (Cl. 56—19)

This invention relates to improvements in harvesters for pod-type vegetables such as snap beans, peas, black-eyed peas, and the like; more particularly, it relates to improvements in the picking portion of such harvesters.

Mechanical harvesting of beans and other pod type vegetables, as practiced heretofore, has dissatisfied the farmers by the relatively slow speed of the picking operation, the relatively low yield of pods obtained per plant and per acre, and the breakage, bruising, or damage of many of the pods. In general, the efficiency of the harvesters heretofore in use has been criticized by many who have used them or by others who have refused to use them because of these deficiencies.

A general object of the present invention is to increase the efficiency of the picking apparatus on pod harvesters, to increase the speed of their operation, to increase the effective yield (that is, the number of pods actually harvester and the ratio to those left on the ground or on the plants), and to improve the quality of the harvested pods by reducing their damage, breakage, and bruising. By improving the quality of the crop, the effective yield is also increased as a direct result, since the number of usable pods per acre is considerably raised.

Another difficulty with pod harvesters heretofore in use has been their tendency to pick up an excessive amount of dirt, stones, and refuse from the ground. For example, in the Grether Patent 2,641,888 a short rear reel is used to pick bean pods off the ground from inside an area which is enclosed by a pair of ground-engaging members that are arranged to straddle a row of bean stalks. When picking pods directly off the ground, loose clods of dirt, stones, and other foreign matter have been impelled into the harvested crop. As a result, the harvested crop has required a great deal more cleaning than did hand harvested crops.

Another object of the present invention is to pick up considerably less dirt, stones, and other foreign matter while harvesting pods close to the ground.

In achieving the objects discussed above and in effecting more efficient and cleaner bean harvesting, several mechanical problems had to be solved, some of which can be briefly discussed at this point, while others will have to be postponed and discussed at an appropriate time in the more detailed description of the invention.

A typical prior-art bean harvester, like that shown in the Ward Patent Re. 25,044, employs a rotating reel with projecting tines that require the cooperation of a concave mold board to achieve the picking. The mold board, being concave, has required careful and expensive fabrication, and since it is an agricultural machine given hard use in the field, it is not feasible in such machines to narrow the clearance between the mold board and the tines enough to be able to achieve the maximum efficiency of picking. Instead, the distances have been more than twice what I have found they should be, yet the distance could not be reduced as a practical matter due to difficulties inherent in the mold-board type of structure.

The present invention eliminates the mold board and in its place, the tines pick very close to a straight edge. My new structure enables me to place the edge closer to the tines and to keep the distance between them precise, so that the efficiency of picking is considerably improved.

Another problem with prior art harvesters has been their tendency to bend the vines over the central conveyor (or outside conveyors, if such are used) and to bend and break the vine stem or to strip leaves from them and deposit them on the conveyor. This, too, has required further cleaning of the crop, and it has also damaged the vines. Another object of the present invention is to reduce the damage to the vines and to reduce the deposit of plant material—other than pods—on the conveyor; this object is accomplished by means of a bar located at a rather critical distance above the stripping edge and parallel to that edge, so that the vines are kept from being pushed too far over the conveyor.

Another problem met with prior-art harvesters of the type using tines, has been the tendency of the tines to become entangled with the vines. Shields have been employed, but they have not been fully effective. The present invention, by a novel mounting of the tines, makes it possible to provide a much more effective shield at this point, in addition to the usual shield; this novel structure helps to prevent damage to the vines and also improves the efficiency of operation of the machine.

Another problem with pad harvesters heretofore in use has been due to tilting the drums from a higher level at the front to a lower level at the rear, in order to assure stripping a considerable vertical portion of the bean vine. Tilting has increased the expense of fabricating the mold board, especially to a concave shape or to the warped shape used by some other harvesters, and the tilting has made it more difficult to achieve the desired tolerances. At the same time, with either the single reel, or Grether's double reel with a single drive, the speed of rotation of the reel was constant, yet I have found that a slower speed up front and a higher speed in the rear achieves superior results. Accordingly, in the present invention I provide a series of reels, all located horizontally at successively lower levels. They accomplish vertical stripping without being tilted and without the problems occasioned by tilting. They meet the stalks while parallel to the stalks instead of at an angle. They comb the plant, opening it to expose the beans without beating the main stem and without excessive defoliation. This action increases the efficiency of the picking so that a slower tine velocity will accomplish more than a faster tine velocity in angled reels, without the beating action of the angled reels. It gives a more gentle picking but gets more beans and less foliage. Moreover, I provide for driving each reel at a different speed so as to obtain the best speeds and speed ratios for maximum efficiency in picking at the different heights on the vine. This feature alone accounts for a substantial increase in the yield obtainable from a field by mechanical harvesting.

Other objects and advantages of the invention will appear from the following description of a preferred form thereof.

In the drawings:

FIG. 2 is a top plan view on an enlarged scale with respect to FIG. 1 of the picking portion of the apparatus with the outer cover and some other parts removed in order to show the picking mechanism more clearly.

FIG. 3 is a view in side elevation and in section of the picking portion of the apparatus taken along the line 3—3 in FIG. 2.

FIG. 4 is a view on an enlarged scale in front elevation and in section taken along the line 4—4 in FIG. 3, with a portion broken away and shown in section.

FIG. 5 is a view in elevation and in section taken along the line 5—5 in FIG. 2, on a somewhat enlarged scale.

FIG. 6 is a view in elevation and in section of the reels taken along the line 6—6 in FIG. 2 on a somewhat enlarged scale.

FIG. 7 is a view in perspective of one of the picking reels with its cover removed to show how the tines are mounted.

FIG. 8 is a fragmentary view in perspective of a portion of the lower shield, which is mounted on the scow frame and through which the picking fingers operate.

Figure 1:
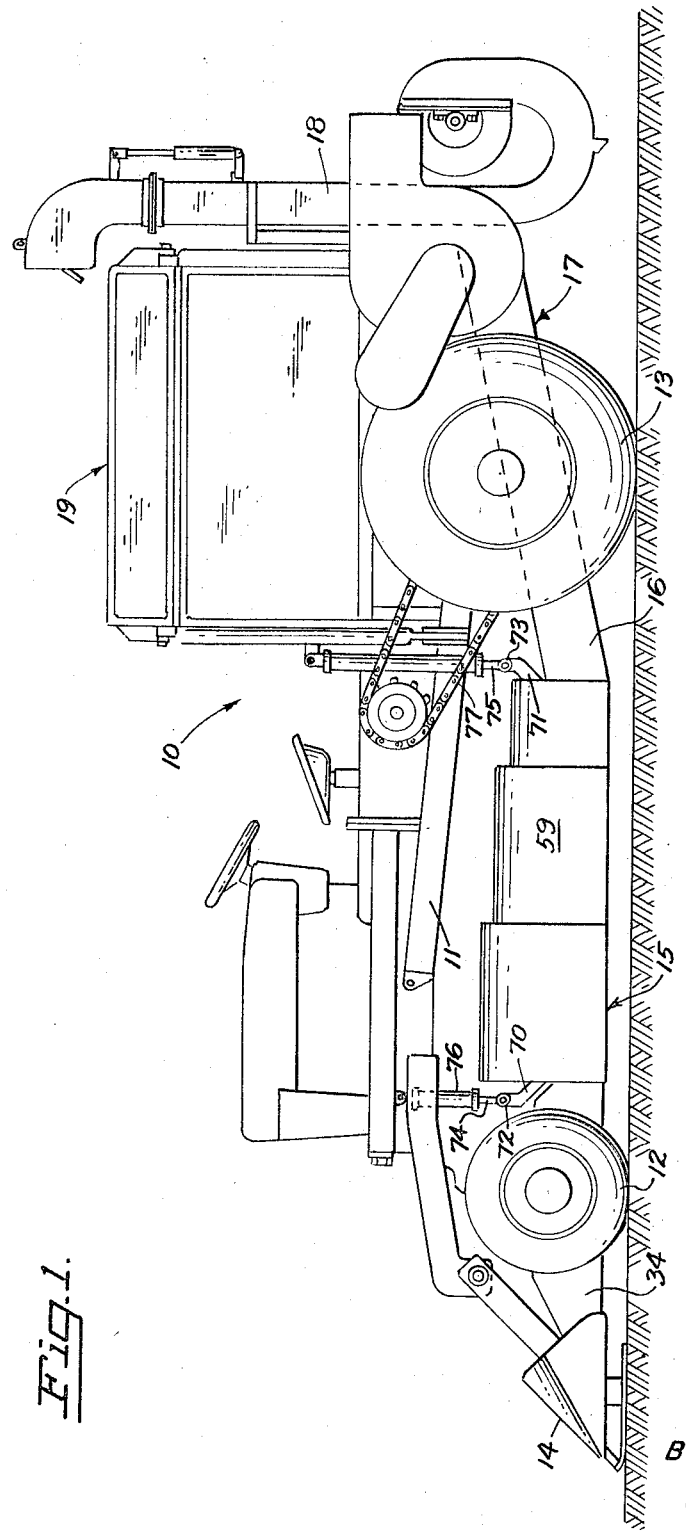
FIG. 1 is a view in side elevation of a pod type harvester embodying the principles of the invention.

As shown in somewhat simplified form in FIG. 1, a harvester 10 embodying the present invention may comprise a main frame 11 having front wheel 12 and rear wheels 13. In front of the front wheels 12 I prefer to provide a pair of guard or shield assemblies 14 such as are described in detail in my co-pending patent application Serial No. 374,345, filed June 11, 1964, which act to help to straighten the bean vines and to keep them away from the wheels 12 and to move the vines in toward the center.

The main features of the present invention lie in a picking assembly 15, a stepped outer cover 59 concealing in this view the mechanism which will soon be described in detail and which acts to remove the pods from the vines and to deposit them on a central conveyor 16 which moves them toward the rear where there is a cleaning assembly 17 and a vertical conduit 18, preferably, by which the vines are lifted and deposited in a dumpable bin 19. These later elements are described in my co-pending application Serial No. 393,277, filed August 31, 1964, and are not directly concerned in the present invention.

The picking assembly 15 of the present invention functions as a unit which can be removed or installed as a unit and can be used with machines having different structure up front and to the rear of the picking assembly 15. An important part of the picking assembly 15 is a central basic member which I term a scow 20, which includes side members 21 and 22 and a connecting base member 23. The scow supports the flighted conveyor 16 for movement on the upper surface from the front toward the rear where it leads to the cleaning assembly 17.

The scow 20 provides a bed 24 on which the lower run of the conveyor rests and guide means 25 on which the upper run of the conveyor 16 rests, and it supports at least one of the drive and idle rollers 26 for the conveyor 16. As shown in FIG. 6, the scow has its side walls stepped to provide by way of example three main sections, a high front section 27, a medium high section 28 in the middle, and a low rear section 29 at the rear of the scow 20. There may, of course, be more sections if that is desired for any particular crop but it has been found that for string beans and snap beans the three levels are sufficient.

In the two forward sections 27 and 28 the side walls 21 and 22 are connected to inwardly sloping members 30 that slope in toward the central conveyor 16. Where the side walls 21 and 22 meet their sloping portions 30 is an edge 31 which is carefully located to provide a very close clearance with the tines of the picking reels. Above the sloping portion 30 and set inwardly from it at a critical distance of about four to five inches—three inches is too small and six inches too large—are a pair of rods 32 which are stepped to correspond with the stepping of the edge 31. These rods 32 perform a very important function, namely, that of limiting the amount which the vines can be pushed in over the center and thereby over the conveyor 16.

At the rear end portion 29 of the scow 20 the side walls 21 and 22 are very short, and their upper edge 33 is very low toward the ground.

At the front end of the scow are guard means 34 to protect the conveyor 16 from damage and from entanglement with the vines and to divert the vines to each side of the scow 20, and a central cover 35.

Reel support members 36 and 37 extend up from the scow 20 and support successively, on suitable bearings, two main drive shafts 40 and a pair of drive shafts 41, 42, and 43 for three pairs of picking reels 44, 45, and 46. Each reel 44, 45, 46 includes suitable web or disc members 47 secured to the shaft 41, 42, or 43 and a series of peripheral longitudinally extending square bars 48. The bars 48 are used to mount the tines 50, which may be mounted in pairs, the pairs being separated, if desired, by the disc or web members 47. Each tine 50 preferably has a coil spring portion 51, which is mounted on one side of one of the square bars 48 and its end is secured to the outer periphery of its square bar 48 by a suitable bracket 53. Each bracket 53 may hold down both of the tines 50, as shown in the drawings. This particular mounting of the tines 50 makes it possible to provide a cylindrical cover 54 adjacent the longitudinally extending square bars 48 and adjacent their outer periphery so that the entire inner portion of each reel is covered and protected from access by the vines. This helps to prevent the vines from becoming entangled with the longitudinal bars 48 or discs or webs 47 and also helps to prevent damage to the pods being harvested. The bars 48 being completely covered over by a smooth surface, there is little that can damage the vines or crops and little that can harm the reel itself.

The tines 50 also extend through a suitable stripper 55 (FIG. 8) such as that which has already been in use in other machines, and may comprise, as shown in FIG. 8, a plurality of flat metal strips 56 supporting flat resilient (fiber or rubber) strips 57 with slots 58 located between them through which the tines 50 move when engaging the crop. An overall cover 59 covers the unit 15.

The main drive shaft 40 on each side of the machine is connected to the drive shaft 41 by a chain 60 and suitable sprockets 61 and 62. The drive shaft 41 for the front reels 44 is preferably employed to drive the second drive shaft 42 for the second reel 45 through a suitable chain 63 and sprockets 64 and 65. The third drive shaft 43 for the lowest reel 46 is preferably connected to the main shaft 40 by a chain 66 and sprockets 67 and 68. The connecting of only the end chains 60 and 66 to the main shaft 40 helps to prevent entanglement with those chains and enables suitable guards to be provided at locations distant enough from the tines 50 to avoid the entanglements that might otherwise occur.

I prefer that the front reels 44 run at about three-fourths the speed of the rear reels 46, with the center reel 45 at a speed intermediate those two. Thus, in a typical harvesting operation the front reel 44 may run at about 120 r.p.m. while the rear reel 46 is turning at about 160 r.p.m., and the center reel 45 at about 150 r.p.m.

The scow and reels 44, 45, 46, as noted, are mounted as a picking unit 15 which can readily be installed as a whole in a machine and removed as a whole, yet the reels 44, 45, 46 may be removed from the unit 15 without having to remove the scow 20. The unit 15 is provided with a pair of rods 70 at the front end and at the rear end 71 which are pivoted to a clevised yoke 72 or 73 of a rod 74 or 75 of a piston of a hydraulic cylinder 76 or 77. There are preferably two cylinders 76 at the front end and two cylinders 77 at the rear end of the machine 10, all attached to the frame 11 and joined together in a single hydraulic system for raising and lowering the picking unit 15. The front of the unit 15 may be raised independently from the rear, or the rear independently from the front to adjust the device to an angle, if that is desired, during the process of picking, or the entire unit 15 may be raised vertically, as when transporting the machine 10 over rough ground or when making a turn-around. This feature helps to adjust the machine to high-growing beans and low-growing beans, to picking in wet soil conditions where the scow 20 would normally drag over the ground and cause the machine 10 to bog down, to picking in dry ground where that is not necessary, and picking in rough ground where it may be necessary to raise the scow 20 off the level, or picking over smooth ground where the level may more efficiently be lower.

In the actual picking operation, the snap bean hangs down with the weight of the bean going down and the tine fingers pass between the stalks and the point of connection of the bean, severing the beans from the plant itself. The impact of the tines 50 hitting the beans at this time also throws the beans up onto the conveyor. The tines 50 pass about 1/4" away from the edges 31 and 33 of the scow 20, which helps to improve the picking and to reduce the breakage of beans. The lower edge 78 of the scow 20 acts like a guide to determine the height of the plant but does not have any function in the picking operation. The side plates 21, 22 keep the plant from getting under the scow 20 or getting into the conveyor belt 16. The axial and horizontal alignment of the reels means that when the tines 50 pass through the beans, they are passing through in a direction parallel with the vertical main stalk of the plant. As a result, considerably less resistance and friction are met by the tines 50, and far less foliage is removed from the plant, reducing the cleaning problem later on. The point of picking starts at the lowest part of the plant with which the reel comes in contact and moves upward, so that the impact forces the beans into the air instead of toward the ground, thereby making it possible to achieve cleaner picking. Moving from the front to the rear, each reel 44, 45, 46 successively starts with the lower part of its movement and moves upwardly along the plant during the picking operation.

In the meantime, the tines 50 sweep near to the rod 32, which prevents the plant from being pushed over the conveyor 16, keeping the vines from becoming entangled with the belt.

Suppose, for example, with a 30-inch plant that the reels come in contact with the plant, imparting to it a sideward motion that tends to bend the vine over. If it were bent too far, it would come out into the center of the conveyor belt 16, whereas the rods 32, when located between four and five inches from the edge 31, support the plant and keep it from lying down on the conveyor belt 16 and having the picked beans fall on top of the plant and then thrown back when the plant straightens up again. This also improves the amount of yield obtained from the crop. Thus, the principal function of the rods 32 is to support the upper part of the plant. The momentum of the reels helps to move the plant out of the way and prevent it from wrapping around any of the other parts.

The differential picking speeds are effective because the heaviest part of the bean stalk is located at the bottom of the plant where it takes more momentum to remove the beans from the plant. By varying the speed so that the highest speeds come when engaging the bottom portion of the plant, it is easier to remove the beans from that portion, while it is also possible to use slower speeds and obtain better results at the upper portion of the plant. The tines 50 thus initially strike the plant at a relatively slower speed, combing it to expose the beans and helping the stalk to assume or remain in a vertical position, which is taken further advantage of later when the rear reels 46 are picking more vigorously. This is conducive to more gentle picking and avoids some of the impact or sudden shock at initial contact, thereby helping to prevent plucking out the plant by its roots, as tends to happen where the initial impact is too great.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A picking unit for a harvester for beans and the like, including in combination
   a scow having a lower edge extending axially up from which extends a vertical side wall providing stepped horizontal edges having a highest edge level over a front portion, a lowest edge level at a rear portion, and an intermediate edge level at an intermediate portion,
   a conveyor moving on said scow and spaced from said edge, and a reel assembly at the opposite side of said edge from said conveyor and comprising an upper forward reel paralleling said front portion, a lower rear reel, paralleling said rear portion, and an intermediate reel paralleling said intermediate portion, each said reel having a plurality of picking tines that come closely adjacent the edge it parallels.
2. The unit of claim 1 wherein the tines come within 1/4" from the edges of said scow.
3. The unit of claim 1 wherein the scow has rod means parallel to the edges of said front and intermediate portions, being above those edges and in toward the conveyor from said edges.
4. The unit of claim 3 wherein the rod means lies between four and five inches from said edges.
5. The unit of claim 1 wherein the forward reel rotates at 3/4 the speed of the rear reel, with the intermediate reel rotating at an intermediate speed.
6. The unit of claim 1 wherein the forward reel rotates at about 120 r.p.m., the rear reel at about 160 r.p.m. and the intermediate reel at a speed in between the speeds of the forward and rear reels.
7. The unit of claim 1 wherein said scow has an inwardly and downwardly sloping member leading toward said conveyor from the edge of said front and intermediate portions.
8. The unit of claim 1 wherein each reel comprises a drive shaft, a plurality of disc-like webs secured to said drive shaft, a plurality of square bars supported by said webs at a uniform distance from and parallel to said drive shaft, and a plurality of said tines, each having a coil spring portion mounted to a radially extending wall of a said square bar, and bracket means securing an end portion of each said tine to the radially outer axial surface of a said square bar.
9. The unit of claim 8 having a cylindrical shell around and closely adjacent to said square bars.
10. A picking unit for a harvester for beans and the linke, including in combination
    a scow having parallel lengthwise extending lower edges up from which extend a pair of vertical side walls with stepped horizontal edges providing a highest edge level over a front portion, a lowest edge level at a rear portion, and an intermediate edge level at an intermediate portion,
    a conveyor for harvested pods in the center of said scow, and
    a pair of reel assemblies, comprising an upper forward reel on each side of said front portion, a lower rear reel on each side of each said rear portion, and an intermediate reel on each side of said intermediate portion, each said reel having a plurality of picking tines that come closely adjacent their said edges.
11. The unit of claim 10 wherein the tines come within 1/4" of the edges of said scow.
12. The unit of claim 10 wherein the scow has a pair of rods parallel to the two edges of said front and intermediate portions, being above and inward from said edges.
13. The unit of claim 12 wherein the rods lie between four and five inches from said edges.
14. The unit of claim 10 having means for rotating the forward reel at 3/4 the speed of the rear reel, and for rotating the intermediate reel at an intermediate speed.

15. The unit of claim 10 having means for rotating the forward reel at about 120 r.p.m., the rear reel at about 160 r.p.m., and the intermediate reel at a speed in between the speeds of the forward and rear reels.

16. The unit of claim 10 wherein said scow has inwardly and downwardly sloping members leading from each said edge toward said conveyor.

17. The unit of claim 10 wherein each reel comprises a drive shaft, a plurality of disc-like webs secured to said drive shaft, a plurality of square bars supported by said webs at a uniform distance from and parallel to said drive shaft, and a plurality of said tines, each having a coil spring portion mounted to a radially extending wall of a said square bar, and bracket means securing an end portion of each said tine to the radially outer axial surface of a said square bar.

18. The unit of claim 17 having a cylindrical shell around and closely adjacent to said square bars.

19. A harvester for beans and the like, including in combination
a main wheel supported frame,
a scow supported by said frame axially thereof and having axially extending parallel lower side edges up from which extend a pair of vertical side walls axial of said frame, providing stepped horizontal edges having a highest level over a front portion, a lowest level at a rear portion, and an intermediate level at an intermediate portion,
means for raising and lowering the front end of said scow,
means for raising and lowering the rear end of said scow,
a conveyor in the center of said scow, and
a pair of main drive shafts supported by said scow,
a pair of reel assemblies supported by said scow and comprising an upper forward reel on each side of said front portion, a lower rear reel on each side of each said rear portion, and an intermediate reel on each side of said intermediate portion, each said reel having a reel drive shaft driven by a said main drive shaft and having a plurality of picking tines that come closely adjacent their said edges.

20. The unit of claim 19 wherein the reel assemblies are so supported by said scow that the tines come within ¼″ from the edges of said scow.

21. The unit of claim 19 wherein the scow has a pair of rods parallel to the edges of said front and intermediate portions, being above and inward from said edges.

22. The unit of claim 21 wherein the rods lie between four and five inches from said edges.

23. The unit of claim 19 wherein the main drive shafts acts through ratio means to rotate the forward reel at ¾ the speed of the rear reel, and the intermediate reel at an intermediate speed.

24. The unit of claim 19 wherein the main drive shaft acts through ratio means to rotate the forward reel at about 120 r.p.m., the rear reel at about 160 r.p.m., and the intermediate reel at a speed in between the speeds of the forward and rear reels.

25. The unit of claim 19 wherein there is a main drive shaft and each said reel comprises a reel drive shaft driven by said main drive shaft, a plurality of disc-like webs secured to said reel drive shaft, a plurality of square bars supported by said webs at a uniform distance from and parallel to said drive shaft, and a plurality of said tines, each having a coil spring portion mounted to a radially extending wall of a said square bar, and bracket means securing an end portion of each said tine to the radially outer axial surface of said bars.

26. The unit of claim 25 having a cylindrical shell around and closely adjacent to said square bars.

27. The unit of claim 19 wherein the scow, conveyor, and reel assemblies comprise a picking unit that is removable from said frame as a unit and wherein each reel assembly is also separately removable from said scow.

References Cited by the Examiner
UNITED STATES PATENTS

| | | | |
|---|---|---|---|
| Re. 25,044 | 10/1961 | Ward | 56—130 |
| 2,641,888 | 6/1953 | Grether | 56—19 |
| 2,673,439 | 3/1954 | Sawyer et al. | 56—33 |
| 2,713,762 | 7/1955 | Clausen | 56—364 |
| 2,880,564 | 4/1959 | Degenhardt | 56—364 |

ABRAHAM G. STONE, *Primary Examiner.*

ANTONIO F. GUIDA, *Examiner.*